Figure 3:
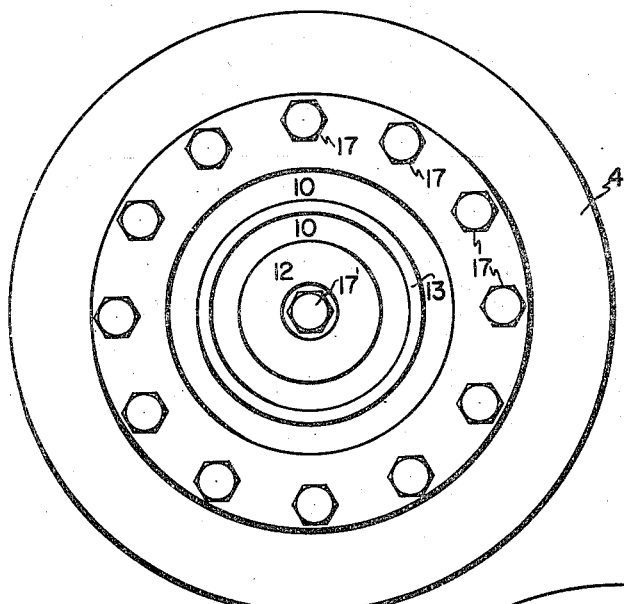

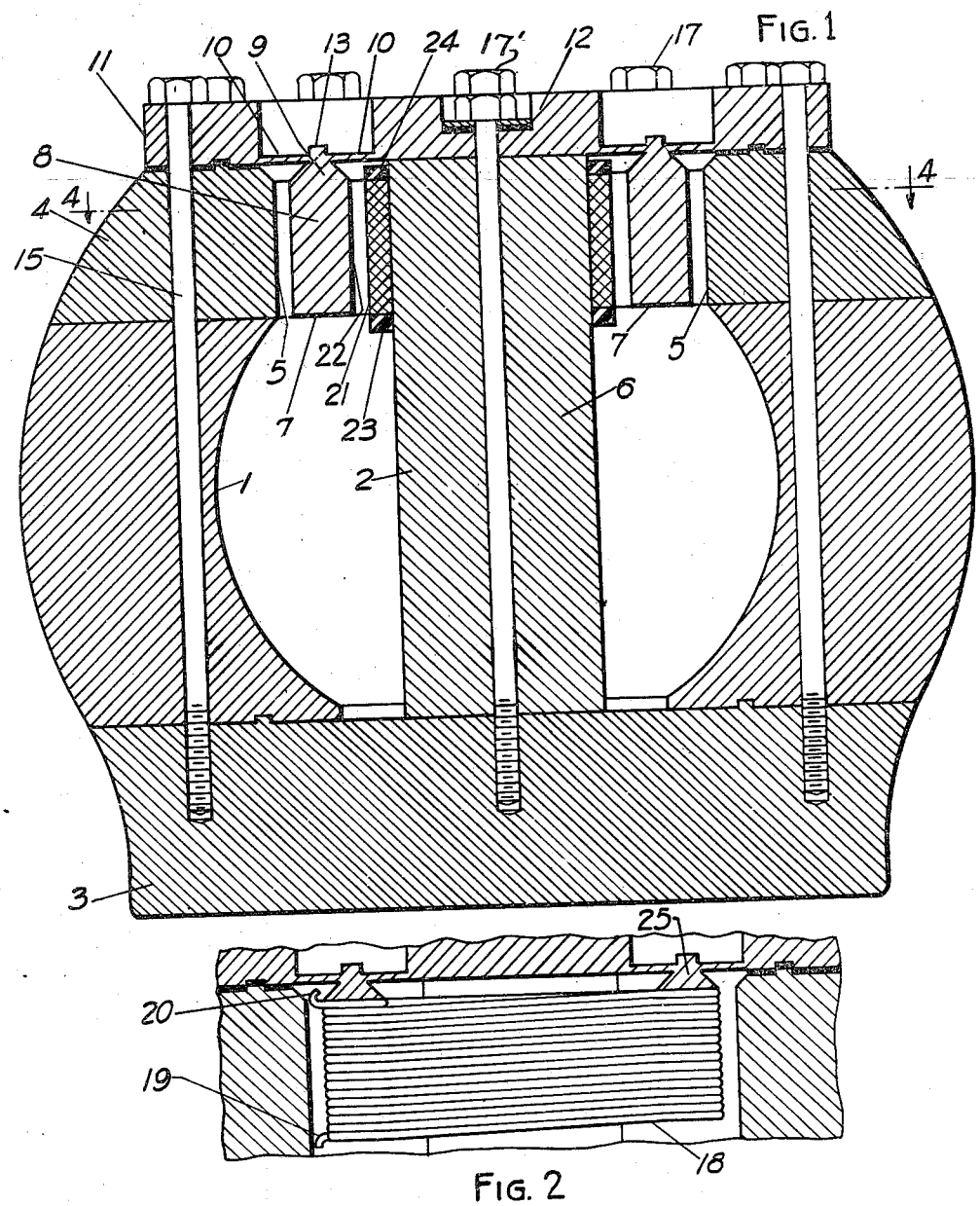

INVENTOR.
HUGO BENIOFF

Patented Aug. 6, 1946

2,405,185

UNITED STATES PATENT OFFICE 2,405,185

SOUND TRANSMITTER AND RECEIVER

Hugo Benioff, La Canada, Calif., assignor to Submarine Signal Company, Boston, Mass., a corporation of Maine Application October 8, 1941, Serial No. 414,131

4 Claims. (Cl. 177—386)

The present invention relates to sound producing and receiving devices, and particularly such type of sound producers to propagate and receive sound in a liquid and solid medium.

Such liquid media, as water and other comparatively heavy viscous substances, are comparatively incompressible as compared to gases and air. As a result in order to produce useful motional amplitudes, forces of comparatively greater magnitude are necessary than forces in air.

In the art of submarine signaling, amplitude transformations have been obtained by the use of tuned vibratory systems in which the element moving in air or gas has a small mass and large amplitude, while that moving in the water or liquid medium has a large mass and small amplitude. In this case the forces are transformed in relation to the masses so that the large mass with its small amplitude has a comparatively large force and is therefore able to operate against the water or liquid medium in a useful manner. These amplitude transformation systems with unequal masses are coupled by elastic elements which together with the masses produce a sharply resonant system and are therefore more useful for single frequency response and transmission.

The object of the present invention is to construct a device which is not sharply tuned so that it will respond over a comparatively broad frequency range and yet in its nature provide an amplitude transformation means so that the conversion of the mechanical energy to the liquid propagating medium or, vice versa, is efficiently and usefully accomplished.

In the present invention the vibrating member is so designed that the conversion of electrical energy to mechanical vibration takes place over a large area while the conversion of this mechanical energy to propagation in the water medium takes place in a comparatively small area. This construction, further, is obtained by employing a comparatively large mass with only a small portion thereof exposed to the liquid propagating medium. The vibrating member is supported by a comparatively thin web so that any resonance of the whole structure is made at a frequency out of the range of the normal operating frequency of the system. While the above principle is particularly applicable to an electrodynamic vibrating system, it may likewise be applied to an electromagnetic system with suitable changes in the arrangement of the driving means.

The present invention may be usefully employed for receiving sounds under water from unknown objects and transmitting sounds to receiving systems under certain unknown conditions, as, for instance, in creating sounds for exploding of sound-operated mines and in getting reflections of sound waves from unknown objects.

Figure 4:
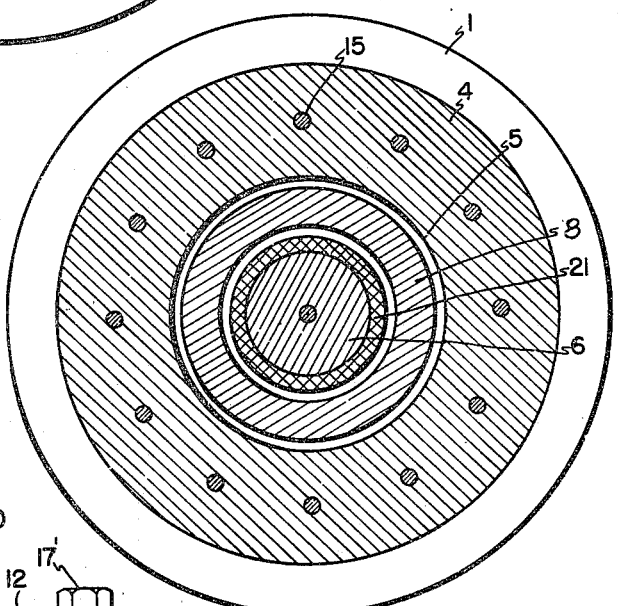
Figure 5:
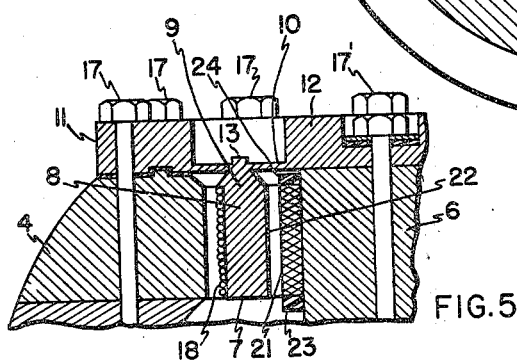

The invention will now be described in connection with the drawings in which Fig. 1 shows a vertical section; Fig. 2 shows a modification of a detail of Fig. 1; Fig. 3 is a top view of the device shown in Fig. 1; Fig. 4 is a section taken on the line 4—4 of Fig. 1; and Fig. 5 is a detail of the modification shown in Fig. 2.

In Fig. 1 the device comprises a magnetic circuit built up of a shell 1 which may be of "Alnico" or other permanent magnetic material of high magnetic intensity, a central iron core 2 of magnetic conductivity, a base plate 3 forming a low reluctance path between the shell and core and a top ring element 4 fitting the top of the shell and forming with its inner surface 5 a pole face from which the magnetic circuit is completed over the airgap to the top section 6 of the center core 2. Each of the members 2, 3 and 4 may be highly magnetically conductive for the permanent magnet flux set up through the shell 1 and may therefore provide a strong permanent magnetic field in the ring airgap 7 in which is positioned the conductive ring 8. The conductive ring 8 is a member of large mass throughout practically all of the section in the airgap 7. The mass or ring element 8 may at its top sides taper to a smaller section 9 from which extends the web 10 in the form of an annular disc which on the outside emerges into the heavy ring 11 and on the inner side into the heavy plate 12 supporting the web. The central small section 9 of the mass 8 may project outward from the web 10 in the form of a boss 13 which is the principal radiating element of the system. Suitable force factors may in this way be obtained between the energy applied to the vibrating mass and that radiated into the water medium. Transformation of forces anywhere from ratios of unity upwards to twenty or more may in this way be easily obtained.

The heavy ring 11, as indicated in the drawings, may be clamped to the top ring 4 by means of the long bolts 15 with bolt heads 17 which pass through the ring 11 and the ring 4 and thread into the base plate 3 so that the unit may be simply and rigidly assembled. The central plate section 12 may also be held to the core 2 by suitable long bolts 17'.

The member 8 should be conductive and may be surrounded by a coil formed in flat spiral layers as indicated by the coil 18 of Fig. 2, in which case when the unit is used as a transmitter, alternating current or pulsating direct current may be impressed upon the coil through the end terminals 19 and 20. The spiral coil may be attached in any suitable manner to the supporting member 25 which serves the same purpose as the tapered section 9 of the member 8 in Fig. 1. However, the element 8 as a conductor in Fig. 1 is energized through transformer relation with the coil 21 which is mounted in the airgap 7 between the wall of the core 2 and the face 22 of the member 8. This coil may be suitably supported by insulating rings 23 and 24 placed below and above the coil member. When used as a transmitter, the desired varying current which may be alternating or otherwise is passed through the coil 21 which induces current in the member 8 and thereby produces vibration of the vibrating structure.

Since the compliance provided by the supporting web or disc 10 is very small, and since also the height of the member 8 is small compared to the quarter of the wave length of the lowest frequency desired to transmit or receive, the natural frequency of the unit as a whole will be very low. For instance, whereas the device is primarily designed to operate at frequencies around or above 3000 cycles per second, the resonance of the unit as a whole is well below 1000 cycles so that the response of the device for reception and also its operation for transmission is substantially smooth over a broad operating frequency range.

Having now described my invention, I claim:

1. A sound transmitting and receiving device comprising a circular casing having an open end, a cover for said open end, said cover being cut away in an annular area thereof to leave an annular portion of relatively little thickness in comparison to the thickness of the cover to form a diaphragm, the diaphragm supporting an annular conductive mass element having a small portion in acoustic relation with the liquid propagating medium, radially centrally positioned in the annular diaphragm, and having a larger portion shielded from the medium, the larger portion having a tapered portion merging into the small portion, means providing a magnetic field in which the larger portion of the conductive element is positioned, and means for energizing the conductive element with variable current for transmitting or taking off variable current when the device acts as a receiver.

2. A sound transmitting and receiving device comprising an enclosed shell-type casing with one end thereof serving as a diaphragm having a portion thereof formed substantially as a flat ring sectional element, said ring sectional element being substantially thinner than the center portion within the ring and the peripheral portion externally of the ring, a ring shaped mass element concentrically positioned with respect to said ring and having a smaller mass section thereof supported in said diaphragm ring portion exposed to the sound propagating medium and a larger mass section thereof shielded from the propagating medium, said two sections being joined by a tapered neck and said larger mass section being electrically conductive, means providing a magnetic field in which said conductive portion is positioned, and means for energizing said conductive section with variable current when used as a transmitter and taking off variable current when said conductive section is vibrated as a receiver.

3. A sound transmitting and receiving device comprising a circular enclosed shell-type casing with one end thereof serving as a diaphragm having a portion thereof formed as a thin annular element with heavier central and peripheral portions, a centrally positioned member joining the central portion of the diaphragm with the back of the casing and completing a magnetic circuit with the casing, an annular mass element supported in the annular portion of said diaphragm, said annular mass element having a smaller section thereof exposed to the sound propagating medium and a larger section thereof shielded from the propagating medium, said two sections being joined by a tapered neck, and said larger section being electrically conductive, said conductive portion being positioned in a magnetic field formed between the shell section of the casing and the central element, means for providing magnetic flux for such field, and means for supplying current to said conductive portion.

4. A sound transmitting and receiving device comprising a circular casing having an open end, a cover for said open end, said cover being recessed in an annular area thereof to leave an annular portion of relatively little thickness in comparison to the thickness of the cover to form a diaphragm, means supporting said cover to the casing in the peripheral portion thereof, a centrally positioned member of magnetic permeability supported within said casing and supporting the central portion of said cover, said member with said circular casing forming a magnetic air gap, a coil supported at the top of said central member within said air gap, an annular shaped mass element supported by the annular area of said diaphragm with a smaller mass section thereof exposed to the sound propagating medium and a larger section thereof shielded from the propagating medium and positioned in said air gap.

HUGO BENIOFF.